US011875924B2

(12) United States Patent
Hsiao et al.

(10) Patent No.: US 11,875,924 B2

(45) Date of Patent: Jan. 16, 2024

(54) METHOD OF FABRICATING RESISTOR IN IGNITER

(71) Applicant: YAGEO CORPORATION, Kaohsiung (TW)

(72) Inventors: Shen-Li Hsiao, Kaohsiung (TW); Pinhao Hsu, Changhua County (TW)

(73) Assignee: YAGEO CORPORATION, Kaohsiung (TW)

( * ) Notice: Subject to any disclaimer, the term of this patent is extended or adjusted under 35 U.S.C. 154(b) by 0 days.

(21) Appl. No.: 17/806,731

(22) Filed: Jun. 13, 2022

(65) Prior Publication Data

US 2023/0335318 A1 Oct. 19, 2023

(30) Foreign Application Priority Data

Apr. 13, 2022 (CN) ......................... 202210385206.5

(51) Int. Cl.

| | |
|---|---|
| ***H01C 17/065*** | (2006.01) |
| ***H01T 1/16*** | (2006.01) |
| ***H01C 17/245*** | (2006.01) |
| ***H01C 7/22*** | (2006.01) |
| ***H01C 1/142*** | (2006.01) |

(52) U.S. Cl.

CPC ....... *H01C 17/06553* (2013.01); *H01C 1/142* (2013.01); *H01C 7/22* (2013.01); *H01C 17/245* (2013.01); *H01T 1/16* (2013.01)

(58) Field of Classification Search

CPC .... H01C 17/06553; H01C 1/142; H01C 7/22; H01C 17/245; H01T 1/16

See application file for complete search history.

(56) References Cited

U.S. PATENT DOCUMENTS

| | | | | |
|---|---|---|---|---|
| 5,976,392 A * | 11/1999 | Chen ..................... | H01C 17/28 427/419.7 |
| 11,521,767 B2 * | 12/2022 | Hsiao ..................... | H01C 1/14 |
| 2003/0209534 A1 * | 11/2003 | Ferguson ................ | C04B 35/63 501/153 |
| 2019/0301741 A1 | 10/2019 | Shindle et al. | |

FOREIGN PATENT DOCUMENTS

| | | | | |
|---|---|---|---|---|
| CN | 202382273 U * | 8/2012 | .............. F42C 19/12 |
| CN | 108981506 A * | 12/2018 | .............. F42C 19/12 |
| CN | 113140381 A | 7/2021 | |
| CN | 111710488 B | 10/2021 | |
| CN | 113543396 A | 10/2021 | |
| TW | I529751 B | 4/2016 | |
| TW | I687942 B | 3/2020 | |
| TW | I748854 B | 12/2021 | |

OTHER PUBLICATIONS

CN-202382273, machine translation. (Year: 2012).*
CN-108981506, machine translation. (Year: 2018).*

* cited by examiner

*Primary Examiner* — Kyung S Lee

(74) *Attorney, Agent, or Firm* — CKC & Partners Co., LLC

(57) ABSTRACT

A method of fabricating resistors in igniter is provided. The method includes punching an alloy material to obtain a plurality of alloy components. The alloy components are disposed on a substrate, and electrodes are disposed on the substrate. Resistors in igniter are obtained by disposing electrodes on the substrate such that two electrically connecting regions of each alloy component are physically contacting and electrically connecting to the electrodes, respectively. The resulting resistors in igniter have uniform size and stable shape hence showing great ignition performance.

18 Claims, 3 Drawing Sheets

METHOD OF FABRICATING RESISTOR IN IGNITER

RELATED APPLICATION

This application claims priority to China Application Serial Number 202210385206.5, filed Apr. 13, 2022, which is herein incorporated by reference in its entirety.

BACKGROUND

Field of Invention

The present invention relates to a method of fabricating resistors in igniter. More particularly, the present invention relates to a method of fabricating resistors in igniter including Ni—Cr alloy.

Description of Related Art

Resistors in igniter are fused by subjecting electric current to pass through a narrow region of the resistors with a capacitor after charging, thereby achieving igniting. Generally, fabrication of the resistors in igniter is performed with exposing and developing an alloy sheet, and then etching to obtain a specific shape. However, some alloy materials are difficult to be etched, and thus a resistance of the resistors in igniter is difficult to control. Moreover, the etched alloy materials (i.e. the resulted resistors in igniter) may have problems of uneven thickness, hence resulting in defects of ignition failure or poor firing effect.

Therefore, it is needed to provide a method of fabricating resistors in igniter to effectively fabricate the resistors in igniter with uniform size and stable shape.

SUMMARY

An aspect of the present invention provides a method of fabricating a resistor of igniter which fabricates the resistor of igniter with uniform size and stable shape by punching.

According to the aspect of the present invention, the method of fabricating the resistor of igniter is provided. The method includes punching an alloy material to obtain a plurality of alloy components. A body of each of the alloy components has at least one resistor region and two electrically connecting regions. The two electrically connecting regions are respectively disposed at two ends of the body. The at least one resistor region is disposed between the two electrically connecting regions. The alloy components are disposed on the substrate. The electrodes are disposed on the substrate, such that the two electrically connecting regions of each of the alloy components are respectively physically contacted and electrically connected to two of the electrodes to obtain the resistor in igniter.

According to an embodiment of the present invention, the method further includes disposing an adhesive layer over the substrate before disposing the alloy components on the substrate.

According to an embodiment of the present invention, the body has a dumbbell shape and/or an S shape.

According to an embodiment of the present invention, the body comprises at least one narrow portion and/or at least one bending portion.

According to an embodiment of the present invention, the alloy material comprises nickel and chromium.

According to an embodiment of the present invention, the substrate comprises aluminum oxide.

According to an embodiment of the present invention, the disposing the alloy components on the substrate comprises a surface mount technology (SMT).

According to an embodiment of the present invention, the electrodes comprise nickel and tin.

According to an embodiment of the present invention, the method further includes forming a protective layer over the alloy components before disposing the electrodes.

According to an embodiment of the present invention, the method further includes performing a splitting process after disposing the electrodes on the substrate.

According to the aspect of the present invention, the method of fabricating the resistor of igniter is provided. The method includes punching an alloy material with a module to obtain a plurality of alloy components, wherein the alloy material includes nickel and chromium, and each of the alloy components has at least a channel portion between two ends; placing the alloy components on a frontside of a substrate in sequence with a surface mount technology; and disposing a plurality of electrodes on the substrate to obtain the resistors in igniter, wherein the two ends of each of the alloy components contacts two of the electrodes, respectively.

According to an embodiment of the present invention, the method includes disposing an adhesive layer over the substrate before placing the alloy components on the substrate.

According to an embodiment of the present invention, the alloy components have a dumbbell shape and/or an S-shape.

According to an embodiment of the present invention, the channel portion is a narrow portion or a bending portion of the alloy components.

According to an embodiment of the present invention, the resistors in igniter have no through-hole on a backside of the substrate.

According to an embodiment of the present invention, the substrate comprises aluminum oxide.

According to an embodiment of the present invention, the electrodes comprise nickel and tin.

According to an embodiment of the present invention, the method includes forming a protective layer at least covered the channel portion of the alloy components before disposing the electrodes.

According to an embodiment of the present invention, the method includes performing a splitting process after disposing the electrodes on the substrate.

Application of the method of fabricating the resistors in igniter is to punch the alloy material to obtain the resistors in igniter with uniform size and stable shape, resulting in stable resistance and great firing effect.

BRIEF DESCRIPTION OF THE DRAWINGS

Aspects of the present disclosure are best understood from the following detailed description when read with the accompanying Figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
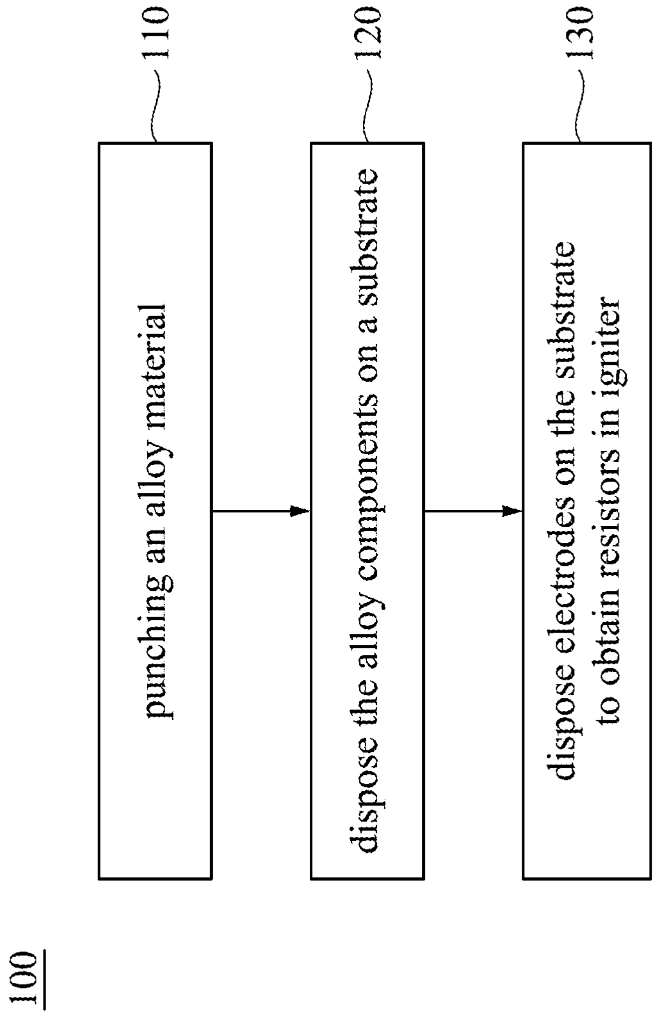
FIG. 1 illustrates a flow chart of a method of fabricating a resistor in igniter according to some embodiments of the present invention.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As described above, the present invention provides a method of fabricating resistors in igniter is by means of punching the alloy material to obtain the resistors in igniter with uniform size and stable shape. The resistors in igniter can have great firing effect while connecting to electrodes at two ends.

The following embodiments are provided to better elucidate the practice of the present invention and should not be interpreted in anyway as to limit the invention. Those skilled in the art will recognize that various alteration and modifications may be made without departing from the spirit and scope of the present invention.

Referring to FIG. 1, which illustrates a flow chart of the method 100 of fabricating the resistors in igniter. It is appreciated that additional operations may be selectively performed before, during and/or after various operations as shown in FIG. 1, and some of the operations may be replace or eliminated. Moreover, order of the operation may be exchanged.

First, operation 110 is performed to use a module punching an alloy material to obtain a plural of alloy components. Before performing operation 110, the module with a specific shape should be manufactured according to a desired shape of the alloy components. In some embodiments, the alloy material includes nickel (Ni) and chromium (Cr), such as Ni—Cr alloy. In some embodiments, the alloy material may be wire or sheet. In some examples, the alloy material is Ni—Cr alloy foil or Ni—Cr alloy wire.

Figure 2B:
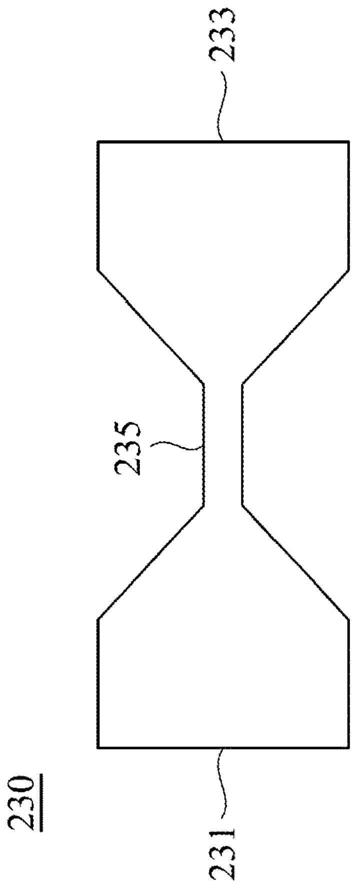
FIGS. 2A and 2B illustrate shape of the alloy components according to some embodiments of the present invention.
Figure 2A:
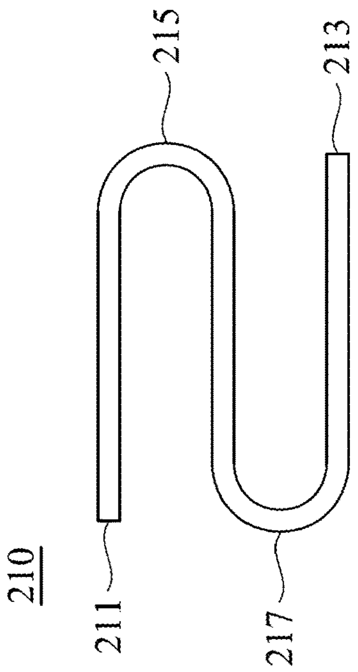

Referring to FIGS. 2A and 2B, which respectively illustrate shapes of the alloy components according to some embodiments. As shown in FIG. 2A, the alloy components may be a bending alloy component 210 in S-shape, in which the alloy component 210 in S-shape has at least one bending portion, electrically connecting portion 211 and electrically connecting portion 213. In some embodiments, a body of the alloy component 210 in S-shape has a uniform width. Although FIG. 2A illustrates the alloy component 210 in S-shape has two bending portions, which are bending portion 215 and bending portion 217, the present invention is not limiting therein. As shown in FIG. 2B, the alloy components may be the alloy components 230 in dumbbell shape, and the alloy component 230 in dumbbell shape includes a narrow portion 235, electrically connecting portion 231 and electrically connecting portion 233.

Since the alloy components are main portion of the resistors in igniter for initiating firing, there's a need for the alloy components to include a portion with specific resistance. Therefore, heat resulted from flowing current may melt channel portions to generate spark thus initiating firing. The bending portion(s), such as the bending portion 215 and the bending portion 217, of the alloy components 210 in S-shape and the narrow portion 235 of the alloy components 230 in dumbbell shape are the channel portions for initiating firing. In other words, the resistors in igniter generate heat by passing current through the channel portions, such as resistor regions, to melt the channel portions, thus initiating firing. Moreover, size and thickness of the channel portions may affect time and energy of firing. If the channel portion is too thick or too wide, it takes too much time for firing and even the firing will fail; on the other hand, if the channel portion is too thin or too narrow, time of firing is too short. Therefore, compared to the conventional exposure and development method, using the punching method can effectively control the size and shape of the alloy components, such that the alloy components can have the channel portions with appropriate thickness and width, thus assuring time and energy of the firing. For example, the resulted resistors in igniter may be controlled as having resistance of 2 ohm to 8 ohm, and may initiate firing after passing current for 0.2 microsecond.

Subsequently, operation 120 is performed to dispose the alloy components on a substrate. In some embodiments, before performing operation 120, an adhesive layer is disposed over the substrate, thus helping dispose the alloy components. In some embodiments, the substrate includes aluminum oxide ($Al_2O_3$). Aluminum oxide has great thermal conductivity. When current or voltage do not reach specific value for initiating firing, the heat generated from the current passing through the substrate may be exported, thus increasing safety of utilization.

In some embodiments, operation 120 includes place the plural of alloy components on the substrate in a fixed interval or randomly by using a surface mount technology (SMT), for example. As a result, the resistors in igniter can have no through-hole on a backside of the substrate, and there's also no problem of poor conduction.

Figure 3:
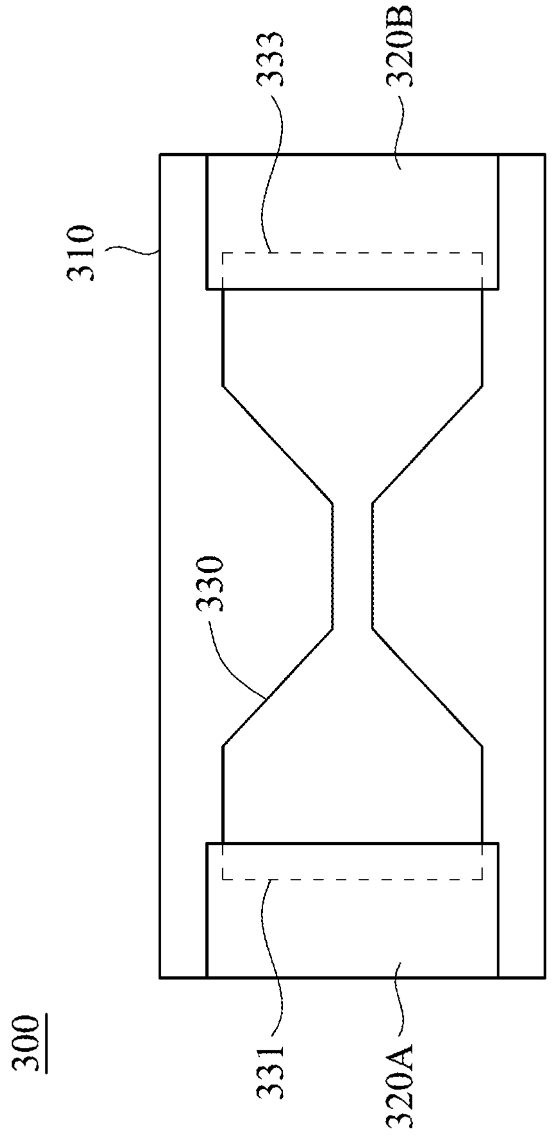
FIG. 3 illustrates a diagram of an individual resistor in igniter according to some embodiments of the present invention.

Referring both FIG. 1 and FIG. 3, in which FIG. 3 illustrates a diagram of individual resistor in igniter 300 according to some embodiments of the present invention. After performing operation 120, operation 130 is performed to dispose electrode 320A and electrode 320B on the substrate 310 to obtain a number of resistors in igniter 300. In order to illustrate explicitly, FIG. 3 only illustrates individual resistor in igniter 300. It is appreciated that the number of alloy components 330 are disposed on the substrate 310 when performing operation 130. The electrode 320A and the electrode 320B are disposed at two ends of each alloy components (i.e. electrically connecting region 331 and electrically connecting region 333) such that two ends of each alloy components are physically contacted and electrically connected to the electrode 320A and the electrode 320B. In some embodiments, the electrode 320A and the electrode 320B include nickel (Ni), tin (Sn) and/or other acceptable material. It is understood that although FIG. 3 illustrates the alloy components in dumbbell shape (e.g. the alloy components 230) as an example, the alloy components in S-shape (e.g. the alloy components 210) or other alloy components with appropriate shape may also be disposed as the resistors in igniter in a similar manner.

In some embodiments, before disposing the electrodes, a protective layer is selectively formed on the alloy components to at least cover the channel portions (i.e. the resistor region), thus avoiding affecting the resistor region while disposing the electrodes and resulting in unstable firing or failure of firing. After performing operation 130, in some embodiments, the method 100 may selectively perform a splitting process to separate and obtain individual resistor in igniter, such as the resistor in igniter 300 as shown in FIG. 3.

As described above, the present invention provides the method of fabricating the resistor in igniter by means of punching the alloy material, which can speed up the process and may obtain the resistors with uniform size and stable shape. Therefore, the resistors in igniter can initiate firing in a desired time and reach desired firing energy while connecting to the electrodes at two ends.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating a resistor in igniter, comprising:

punching an alloy material to obtain a plurality of alloy components, wherein the alloy material comprises Ni—Cr alloy, a body of each of the alloy components has at least one resistor region and two electrically connecting regions, the two electrically connecting regions are respectively disposed at two ends of the body, and the at least one resistor region is disposed between the two electrically connecting regions;

disposing the alloy components on a substrate; and disposing a plurality of electrodes on the substrate, such that the two electrically connecting regions of each of the alloy components are respectively physically contacted and electrically connected to two of the plurality of electrodes to obtain the resistors in igniter.

2. The method of claim 1, further comprising:

disposing an adhesive layer over the substrate before disposing the alloy components on the substrate.

3. The method of claim 1, wherein the body has a dumbbell shape and/or an S-shape.

4. The method of claim 1, wherein the body comprises at least one narrow portion and/or at least one bending portion.

5. The method of claim 1, wherein the substrate comprises aluminum oxide.

6. The method of claim 1, wherein the disposing the alloy components on the substrate comprises a surface mount technology (SMT).

7. The method of claim 1, wherein the electrodes comprise nickel and tin.

8. The method of claim 1, further comprising:

forming a protective layer over the alloy components before disposing the electrodes.

9. The method of claim 1, wherein the method further comprises performing a splitting process after disposing the electrodes on the substrate.

10. A method of fabricating a resistor in igniter, comprising:

punching an alloy material with a module to obtain a plurality of alloy components, wherein the alloy material comprises nickel and chromium, and each of the alloy components has at least a channel portion between two ends;

placing the alloy components on a frontside of a substrate in sequence with a surface mount technology; and disposing a plurality of electrodes on the substrate to obtain the resistors in igniter, wherein the two ends of each of the alloy components contacts two of the electrodes, respectively.

11. The method of claim 10, further comprising:

disposing an adhesive layer over the substrate before placing the alloy components on the substrate.

12. The method of claim 10, wherein the alloy components have a dumbbell shape and/or an S-shape.

13. The method of claim 12, wherein the channel portion is a narrow portion or a bending portion of the alloy components.

14. The method of claim 10, wherein the resistors in igniter have no through-hole on a backside of the substrate.

15. The method of claim 10, wherein the substrate comprises aluminum oxide.

16. The method of claim 10, wherein the electrodes comprise nickel and tin.

17. The method of claim 10, further comprising:

forming a protective layer at least covered the channel portion of the alloy components before disposing the electrodes.

18. The method of claim 10, further comprises:

performing a splitting process after disposing the electrodes on the substrate.

* * * * *